(12) United States Patent
Hornsby

(10) Patent No.: US 10,119,390 B2
(45) Date of Patent: Nov. 6, 2018

(54) REMOTE TOOL POSITION AND TOOL STATUS INDICATION

(71) Applicant: HALLIBURTON ENERGY SERVICES, INC., Houston, TX (US)

(72) Inventor: Joshua Max Hornsby, Keller, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/036,616

(22) PCT Filed: Jan. 22, 2014

(86) PCT No.: PCT/US2014/012438
§ 371 (c)(1),
(2) Date: May 13, 2016

(87) PCT Pub. No.: WO2015/112127
PCT Pub. Date: Jul. 30, 2015

(65) Prior Publication Data
US 2016/0265344 A1 Sep. 15, 2016

(51) Int. Cl.
E21B 47/09 (2012.01)
E21B 47/00 (2012.01)
E21B 47/12 (2012.01)
E21B 47/16 (2006.01)
G01V 1/44 (2006.01)

(52) U.S. Cl.
CPC .............. E21B 47/09 (2013.01); E21B 47/00 (2013.01); E21B 47/122 (2013.01); E21B 47/16 (2013.01); G01V 1/44 (2013.01)

(58) Field of Classification Search
CPC ...................................................... E21B 47/09
See application file for complete search history.

(56) References Cited

U.S. PATENT DOCUMENTS 4,945,775 A * 8/1990 Adams .................... E21B 47/00
                                                           73/865.8
5,275,038 A    1/1994  Sizer et al.
5,419,188 A    5/1995  Rademaker et al.
5,579,842 A   12/1996  Riley
(Continued)

FOREIGN PATENT DOCUMENTS

EP    1096271    5/2001
EP    1096272    5/2001
(Continued)

OTHER PUBLICATIONS

Australian Patent Application No. 2014379654, First Examination Report, dated Sep. 5, 2016, 4 pages.
(Continued)

Primary Examiner — Amine Benlagsir
(74) Attorney, Agent, or Firm — Kilpatrick Townsend & Stockton LLP

(57) ABSTRACT

A system is described that is positionable downhole in wellbore for determining a parameter of a downhole tool. The system includes a tubing subassembly and a signal generator positioned in the tubing subassembly for outputting, in response to being covered or uncovered by a detectable portion of a downhole tool, a detectable signal for determining a parameter of the downhole tool.

17 Claims, 9 Drawing Sheets

(56) References Cited

U.S. PATENT DOCUMENTS

| | | | |
|---|---|---|---|
| 5,666,050 A * | 9/1997 | Bouldin | E21B 47/0905 166/66.5 |
| 5,925,879 A | 7/1999 | Hay | |
| 6,018,501 A | 1/2000 | Smith et al. | |
| 6,075,461 A | 6/2000 | Smith | |
| 6,177,882 B1 | 1/2001 | Ringgenberg et al. | |
| 6,268,911 B1 | 7/2001 | Tubel et al. | |
| 6,269,198 B1 | 7/2001 | Hodgson et al. | |
| 6,288,975 B1 | 9/2001 | Frederick et al. | |
| 6,481,495 B1 | 11/2002 | Evans | |
| 6,724,319 B1 | 4/2004 | Knaack et al. | |
| 6,728,165 B1 | 4/2004 | Roscigno et al. | |
| 6,769,805 B2 | 8/2004 | Williams | |
| 6,787,758 B2 | 9/2004 | Tubel et al. | |
| 6,828,547 B2 | 12/2004 | Tubel et al. | |
| 6,913,079 B2 | 7/2005 | Tubel | |
| 6,915,686 B2 | 7/2005 | Baustad | |
| 6,943,340 B2 | 9/2005 | Tubel et al. | |
| 6,978,832 B2 | 12/2005 | Gardner et al. | |
| 7,028,543 B2 | 4/2006 | Hardage et al. | |
| 7,040,390 B2 | 5/2006 | Tubel et al. | |
| 7,054,011 B2 | 5/2006 | Zhu et al. | |
| 7,201,221 B2 | 4/2007 | Tubel et al. | |
| 7,201,231 B2 | 4/2007 | Chaplin et al. | |
| 7,219,729 B2 | 5/2007 | Bostick, III et al. | |
| 7,228,900 B2 | 6/2007 | Schultz et al. | |
| 7,240,738 B2 | 7/2007 | Pendleton | |
| 7,245,382 B2 | 7/2007 | Ronnekleiv | |
| 7,254,999 B2 | 8/2007 | Bostick, III | |
| 7,278,480 B2 | 10/2007 | Longfield et al. | |
| 7,284,606 B2 | 10/2007 | Coronado | |
| 7,357,021 B2 | 4/2008 | Blacklaw | |
| 7,417,920 B2 | 8/2008 | Hahn et al. | |
| 7,436,320 B2 | 10/2008 | Miller, Jr. | |
| 7,565,834 B2 | 7/2009 | Adnan et al. | |
| 7,740,064 B2 | 6/2010 | McCoy et al. | |
| 7,797,996 B2 | 9/2010 | Bostick, III | |
| 7,857,066 B2 | 12/2010 | DiFoggio et al. | |
| 7,881,155 B2 | 2/2011 | Close | |
| 7,932,834 B2 | 4/2011 | Beique et al. | |
| 7,946,341 B2 | 5/2011 | Hartog et al. | |
| 7,982,632 B2 | 7/2011 | Miller, Jr. | |
| 7,997,340 B2 | 8/2011 | Bostick, III et al. | |
| 8,109,333 B2 | 2/2012 | Yee | |
| 8,237,443 B2 | 8/2012 | Hopmann et al. | |
| 8,430,163 B2 | 4/2013 | Dupont | |
| 2001/0042617 A1 | 11/2001 | Beck et al. | |
| 2002/0039328 A1 * | 4/2002 | Dubinsky | E21B 47/16 367/82 |
| 2002/0050930 A1 * | 5/2002 | Thomeer | E21B 23/00 340/853.3 |
| 2002/0092649 A1 | 7/2002 | Bixenman et al. | |
| 2002/0104652 A1 | 8/2002 | Cole et al. | |
| 2003/0102980 A1 * | 6/2003 | Koro | E21B 47/122 340/853.7 |
| 2003/0205083 A1 | 11/2003 | Tubel et al. | |
| 2004/0043501 A1 | 3/2004 | Means et al. | |
| 2004/0140092 A1 * | 7/2004 | Robison | E21B 29/02 166/255.1 |
| 2004/0156265 A1 | 8/2004 | Lavrut et al. | |
| 2004/0163809 A1 | 8/2004 | Mayeu et al. | |
| 2004/0194958 A1 * | 10/2004 | Mayeu | E21B 34/14 166/255.1 |
| 2005/0012036 A1 | 1/2005 | Tubel et al. | |
| 2005/0062979 A1 | 3/2005 | Zhu et al. | |
| 2005/0263279 A1 | 12/2005 | Vachon et al. | |
| 2006/0081413 A1 | 4/2006 | Minto | |
| 2007/0012460 A1 | 1/2007 | Coronado | |
| 2007/0139217 A1 | 6/2007 | Beique et al. | |
| 2007/0285274 A1 | 12/2007 | Esmersoy et al. | |
| 2008/0264631 A1 | 10/2008 | Mendez et al. | |
| 2008/0294344 A1 | 11/2008 | Sugiura | |
| 2009/0034368 A1 | 2/2009 | Johnson | |
| 2009/0071645 A1 | 3/2009 | Kenison et al. | |
| 2009/0128141 A1 | 5/2009 | Hopmann et al. | |
| 2009/0188665 A1 | 7/2009 | Tubel et al. | |
| 2009/0199630 A1 | 8/2009 | DiFoggio et al. | |
| 2009/0201764 A1 | 8/2009 | Liu | |
| 2009/0301184 A1 | 12/2009 | Irani et al. | |
| 2010/0013663 A1 | 1/2010 | Cavender et al. | |
| 2010/0018303 A1 | 1/2010 | Bostick, III | |
| 2010/0166358 A1 | 7/2010 | Homa et al. | |
| 2010/0303426 A1 | 12/2010 | Davis | |
| 2010/0309019 A1 | 12/2010 | Shah et al. | |
| 2011/0122727 A1 * | 5/2011 | Gleitman | E21B 36/02 367/81 |
| 2011/0163891 A1 | 7/2011 | Wilson et al. | |
| 2011/0280105 A1 | 11/2011 | Hall et al. | |
| 2012/0037360 A1 | 2/2012 | Arizmendi, Jr. et al. | |
| 2012/0046866 A1 | 2/2012 | Meyer et al. | |
| 2012/0080231 A1 | 4/2012 | Radford et al. | |
| 2012/0147924 A1 | 6/2012 | Hall | |
| 2012/0152562 A1 | 6/2012 | Newton et al. | |
| 2012/0175135 A1 | 7/2012 | Dyer et al. | |
| 2012/0176250 A1 | 7/2012 | Duncan et al. | |
| 2012/0211231 A1 | 8/2012 | Erkol et al. | |
| 2012/0256635 A1 | 10/2012 | Gissler | |
| 2012/0286967 A1 | 11/2012 | Alteirac et al. | |
| 2013/0016979 A1 | 1/2013 | Duncan et al. | |
| 2013/0021874 A1 | 1/2013 | Hartog et al. | |
| 2013/0075161 A1 | 3/2013 | Yang | |
| 2013/0087328 A1 | 4/2013 | Maida, Jr. et al. | |
| 2014/0014329 A1 * | 1/2014 | Radford | E21B 47/00 166/250.01 |
| 2014/0251603 A1 | 9/2014 | Raducanu et al. | |
| 2015/0077265 A1 | 3/2015 | Shah et al. | |
| 2015/0167430 A1 | 6/2015 | Purkis et al. | |

FOREIGN PATENT DOCUMENTS

| | | |
|---|---|---|
| EP | 1096273 | 5/2001 |
| GB | 2364380 | 1/2002 |
| GB | 2436473 | 9/2007 |
| WO | 9850681 | 11/1998 |
| WO | 9857030 | 12/1998 |
| WO | 03017538 | 2/2003 |
| WO | 2015069214 | 5/2015 |
| WO | 2015099641 | 7/2015 |
| WO | 2015102582 | 7/2015 |

OTHER PUBLICATIONS

Acoustic Telemetry System, Halliburton Testing and Subsea, 2010, 4 pages.
Bumper Spring with Collet Latch, Ferguson Bearegard, 2012, 1 page.
EM Telemetry Tool for Deep Well Drilling Applications, Deep Trek Program Solicitation, E-Spectrum Technologies, Inc., 2 pages.
Fiber Optic Sensing Technologies for Well Monitoring to Reservoir Management, Pinanacle, 2012, 7 Pages.
Permanent Downhole Monitoring, Weatherford, 2006, 16 pages.
Permanent Downhole Monitoring Solutions, Promore, Core Lab Reservoir Optimization www.promore.com, 2 pages.
SureView Real-Time Fiber-Optic Compaction Monitoring System, The SureView RTCM system Baker Hughes, 2010, 4 pages.
Andren et al., Integrated Ocean Drilling Program, Expedition 347 Scientific Prospectus, 61 pages.
Camwell et al., Acoustic Telemetry, with Multiple Nodes in Drillstring, used to Achieve Distributed MWD, Innovating While Drilling, Mar./Apr. 2009, pp. 1-6.
Dria , E&P Applications of Fiber Optic Technologies, Myden Energy Consulting PLLC, May 2012, 47 pages.
Fernandez et al., Integrated drilling system using mud actuated down hole hammer as primary engine, Novatek, Report #34365R05, May 1996, 35 pages.
Harper et al., Advanced Acoustic Telemetry System Provides Real-time Data Acquisition that Increases Efficiency in Well Testing Operations, Offshore Technology Conference, May 5-8, 2003, 16 pages.

(56) References Cited

OTHER PUBLICATIONS

Lienau, Direct-Use Downhole Pumps, Geo-Heat Center Quarterly Bulletin vol. 8, No. 3, 1984, 7 Pages.
International Patent Application No. PCT/US2014/012438, International Search Report and Written Opinion, dated Oct. 21, 2014, 15 pages.
Skinner et al., Downhole Fiber-optic Sensing: The Oilfield Service Provider's Perspective, Halliburton Energy Services, Fiber Optic Sensor Technology and Applications III, Proc. of SPIE vol. 5589, 2004, pp. 206-220.
Wassermann et al., How High-Speed Telemetry Affects the Drilling Process, JPT, Jun. 2009, 4 pages.

\* cited by examiner

REMOTE TOOL POSITION AND TOOL STATUS INDICATION

CROSS-REFERENCE TO RELATED APPLICATIONS

This is a U.S. national phase under 35 U.S.C. 371 of International patent application No. PCT/US2014/012438, titled "Remote Tool Position and Tool Status Indication" and filed Jan. 22, 2014, the entirety of which is incorporated herein by reference.

TECHNICAL FIELD

The present disclosure relates generally to indication of tool position, movement, and/or functionality in a well completion.

BACKGROUND

Oilfield operations may involve the use of various tools in a downhole environment located at a significant distance from a tool operator. During use, tools may need to be positioned in exact locations in a well or may include actuating parts or pieces that need to be actuated in certain ways to complete the desired tasks. It may be desirable to determine a position or status of a tool before performing additional operations. It can be difficult to obtain information about the position and status of tools used downhole, including for example the actuation or movement of parts of a tool.

DETAILED DESCRIPTION

One or more signal generators can be provided in a downhole environment to provide recognizable feedback signals to a tool operator as an indication that the tool has reached a desired position or actuated in the intended fashion. The signals can be generated, transmitted, and received electrically, mechanically, acoustically, or through other signaling methodologies. A signal generator can indicate when a tool has moved to a certain position. A signal generator can provide confirmation that a tool has operated properly or improperly, depending upon the application. The confirmation can be a positive confirmation that the tool, or at least a desired portion of the tool, has actually reached a desired position or configuration, rather than simply that it should be in the desired position or configuration. In some cases, multiple signal generators may be used to provide the desired indication.

In some embodiments, a signal generator can generate a signal when it is covered by a tool that is properly set or released downhole or that is properly changed position or actuated downhole. The signal can be detected to confirm that the tool has been properly set, released, actuated, or otherwise changed position downhole. In other embodiments, a signal generator can generate a signal when it is uncovered by a tool and can stop generating the signal when it is covered by the tool that is properly set, released, actuated, or otherwise changed positioned downhole. The absence of the signal can be detected to confirm that the tool has been properly set, released, actuated, or otherwise changed position downhole. In an example, a signal generator may provide positive indication of a port being opened by generating a signal when the port is opened. In such an example, the signal generator may provide positive indication of a port being closed by generating a signal continuously until ceasing when the port is closed. In another example, a signal generator may provide positive indication of a port being opened by generating a signal continuously until ceasing when the port is opened. In such an example, the signal generator may provide positive indication of a port being closed by generating a signal when the port is closed.

In certain embodiments, the signals generated by the signal generator are transmitted to, and received by, a device associated with the tool operator, thus giving the tool operator feedback about the position and status of the tool.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
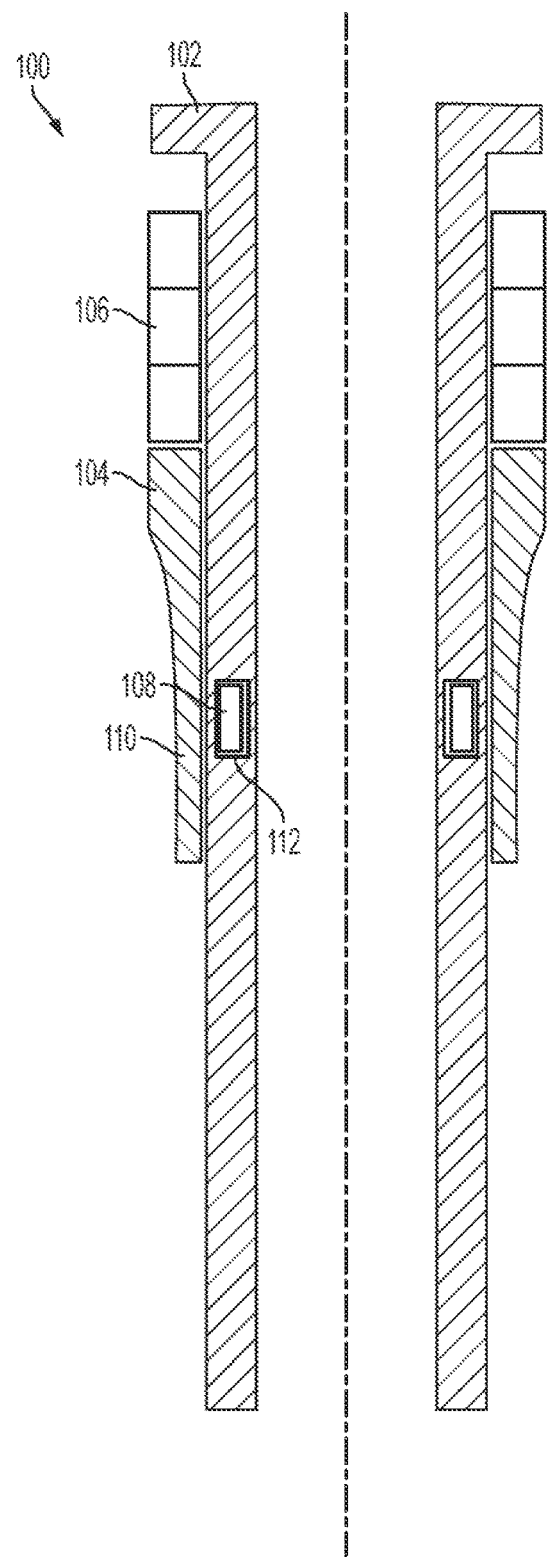
FIG. 1 is a cross-sectional view of an embodiment with a downhole tool covering a set of signal generators incorporated in a tubing string according to one example.

FIG. 1 depicts by cross section an arrangement 100 of downhole equipment according to one embodiment. As used herein, the term "downhole" generally refers to equipment used within a well or borehole and the term "tubing subassembly" refers to any piece of downhole equipment or a part thereof, including a downhole tool. The arrangement 100 includes a tubing string 102, a packer 106, and a tool 104. A tubing string 102 may be positioned within the borehole and may include one or more signal generators 108 positioned proximate the outer diameter ("OD") of the tubing string 102. The signal generators 108 may be included in a compartment 112 or otherwise situated within the desired piece of downhole equipment. The compartment 112 may be entirely enclosed by the downhole equipment or may include holes, access panels, or other openings to aid in sensing, signal generation, signal transmission, or access to the signal generator 108. A tool 104 can removably lock onto the OD of the tubing string 102. The arrangement 100 of FIG. 1 is shown with the tool 104 in an unlocked and released state. When in a released state, the tool 104 may include a portion 110 that is located proximate to the OD of the tubing string 102 and to the signal generator 108. The signal generator 108 may include at least one sensor and at least one signal generation device, as described below. The signal generator 108 may detect the proximity of the portion 110 and provide no signal generation. When the portion 110 is in close proximity to the signal generator 108, the signal generator 108 may be considered to be in a "covered" state. The signal generator 108 may detect the proximity of the portion 110 through various positive and negative methods as recited below.

Figure 2:
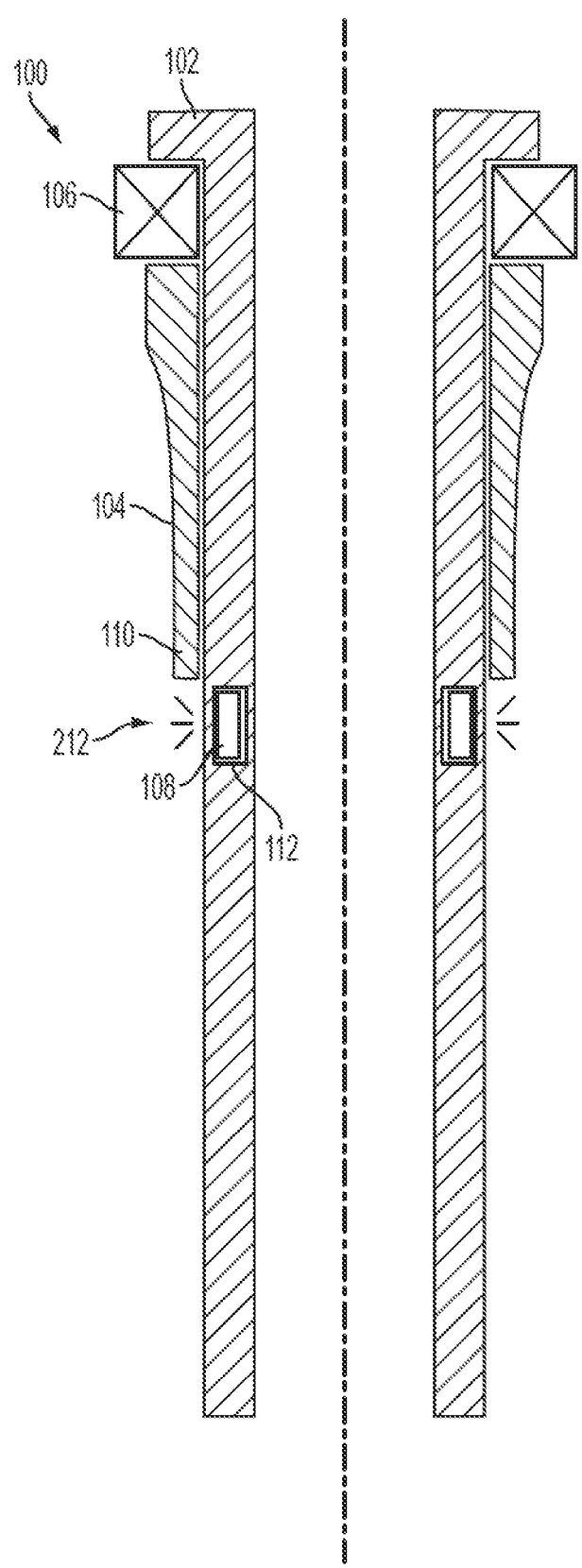
FIG. 2 is a cross-sectional view of the embodiment of FIG. 1 with a downhole tool not covering a set of signal generators incorporated in a tubing string according to one example.

FIG. 2 depicts by cross section the arrangement 100 of downhole equipment of FIG. 1 with the tool 104 in a set state. The portion 110 may not be in close proximity to the signal generator 108 when the tool 104 is in a set state. The signal generator 108 may be considered to be in an "uncovered state" when the portion 110 is not in close proximity to the signal generator 108. The signal generator 108 may generate a signal 212 when in this uncovered state. The signal 212 may take various forms and may be transmitted in various ways, as described below. In some embodiments, a signal generator 108 may be positioned to detect whether the tool 104 is in a locked state or an unlocked state. Detection of whether the tool 104 is in a locked state or an unlocked state may be independent of detection of whether the tool 104 is in a set state or a released state.

Referring to FIGS. 1 and 2, the arrangement 100 includes signal generators 108 that can detect the positions of the tool 104 relative to the tubing string 102. In some embodiments, the signal generators 108 may detect the position of any piece of downhole equipment in relation to any other piece of downhole equipment. The signal generators 108 may be located within the tool 104, the packer 106, or on other downhole equipment. The portion 110 sensed by the signal generators 108 may be included on the tubing string 102, the packer 106, or on other downhole equipment.

Figure 3A:
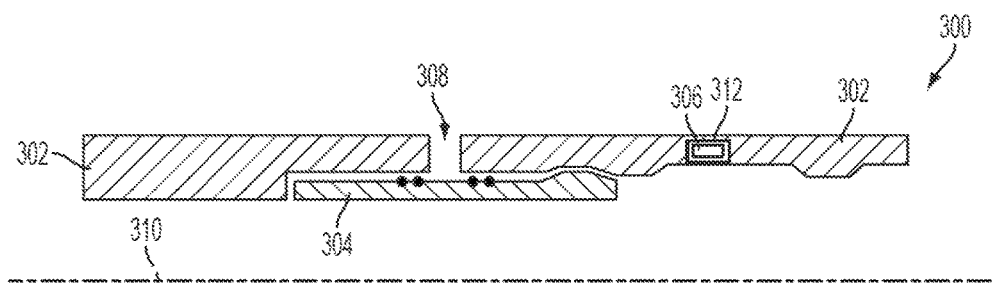
FIG. 3A is a cross-sectional view of an embodiment with a downhole structure having a closed port and a signal generator according to one example.

FIG. 3A depicts by cross section a part of downhole equipment 300 according to a second embodiment. The downhole equipment 300 may include a body section 302 having a port 308. FIG. 3A is a partial view showing only a portion of the piece of downhole equipment 300 on one side of a centerline 310 of a borehole. The port 308 may be opened or closed by an actuatable member 304, shown here in a closed configuration. The body section 302 includes a signal generator 306 located proximate the inner diameter ("ID") of the downhole equipment 300 and within a compartment 312. When the actuatable member 304 is in a closed configuration, the actuatable member 304 is not in close proximity to the signal generator 306, and the signal generator 306 may be considered to be in an "uncovered" state. When in an uncovered state, the signal generator 306 may generate no signal.

Figure 3B:
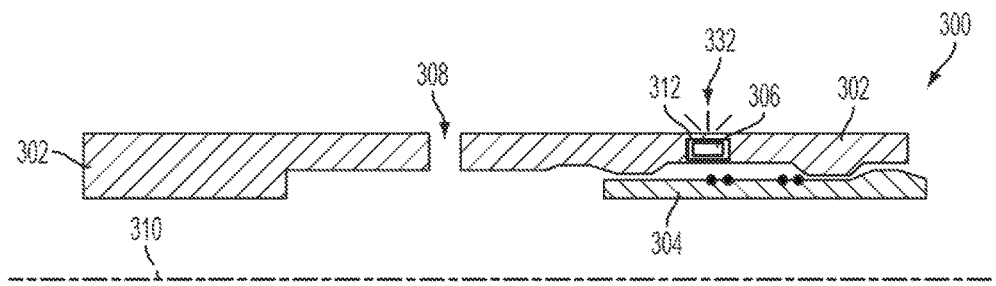
FIG. 3B is a cross-sectional view of the embodiment of FIG. 3A with a downhole structure having a signal generator generating a signal in response to an open port according to one example.

FIG. 3B depicts by cross section the part of downhole equipment 300 of FIG. 3A with the signal generator 306 in a "covered" state. The downhole equipment 300 includes a body section 302 having a port 308. The port 308 is shown here in an open configuration with the actuatable member 304 being in close proximity to the signal generator 306. In this state, the signal generator 306 may be considered to be in a "covered" state. When in a covered state, the signal generator 326 may generate a signal 332, as described below. It will be understood that the signal 332 may take various forms and may be transmitted in various ways, as recited below.

Referring to FIGS. 3A and 3B, the part of downhole equipment 300 includes a signal generator 306 that can detect the position of an actuatable member 304 relative to body section 302. In some embodiments, the actuatable member 304 may be configured for purposes other than opening or closing a port. In some embodiments, a signal generator 306 can detect the position or movement of other types of actuatable members, such as actuatable members that can engage pieces, lock pieces, extend tools, retract tools, extend surfaces, retract surfaces, or any other function that involves a movable part. Signal generators 306 may be positioned such that the signal generators 306 become "covered" or "uncovered" whenever actuatable members, such as those outlined above, change positions to or from a desired position. In some embodiments, the signal generator 306 may be located within the actuatable member 304 or on other downhole equipment and may detect the proximity of certain portions of other downhole equipment, such as portions of the body section 302.

Figure 4:
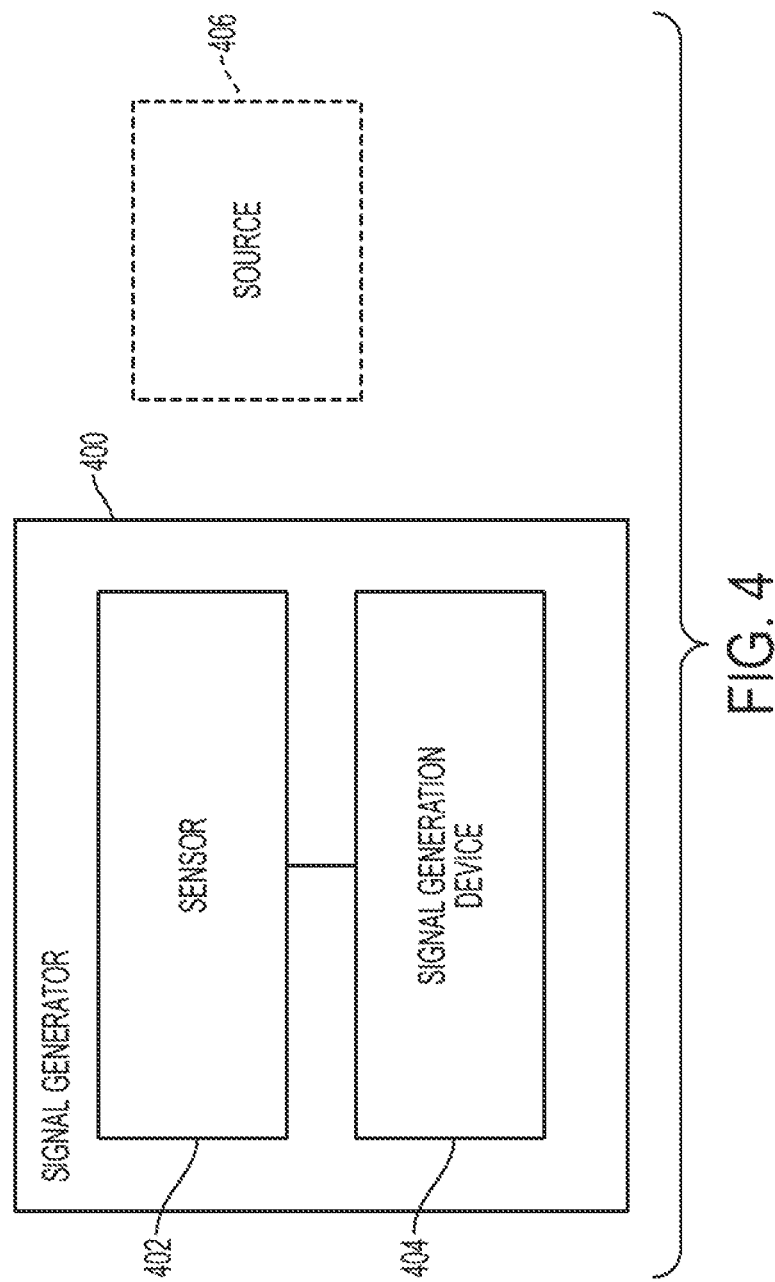
FIG. 4 is a schematic of an embodiment of a signal generator with a sensor and a signal generation device according to one example.

FIG. 4 is a block diagram of an embodiment of a signal generator 400. The signal generator 400 may include a sensor 402 in communication with a signal generation device 404. The sensor 402 and signal generation device 404 may be collocated within a single housing or may be located in separate housings. As used herein, any description of the location of a signal generator 400 within a piece of downhole equipment may be interpreted as describing the location of the sensor 402 of the signal generator 400. A signal generator 400 may include more than one sensor 402 and more than one signal generation device 404.

The sensor 402 may be electrical, magnetic, mechanical, or other type of sensor. For example, the sensor 402 may be a magnetic sensor (e.g., reed switch or hall effect sensor), a pressure sensor (e.g., piezo element or a strain gauge), an optical sensor (e.g., photodetector), a chemical sensor, an electrical sensor (e.g., inductive sensor or capacitive sensor), a flow sensor, a radiation sensor, or an acoustic sensor (e.g., sonar).

The sensor 402 may be configured to detect being covered or uncovered by a desired portion of downhole equipment. In some embodiments, a "detection event" occurs when the sensor 402 is covered. In some embodiments, a "detection event" occurs when the sensor 402 is uncovered.

The position and placement of the sensor 402 may depend on the type of sensor 402 used. In some embodiments, the sensor 402 may interact with a source 406 to properly detect a detection event. The type of source 406 selected to effectuate the sensor 402 may depend on the sensor 402 used. For example, a magnetic sensor may require a source that is a magnet; an optical sensor may require a source that is a light source (e.g., light emitting diode), and a radiation sensor may require a source with measurable radioactive decay. The source 406 may be located external to, or incorporated in the signal generator 400. In some embodiments, the source 406 may be incorporated into the portion of downhole equipment for which detection is desired, such as within an actuatable member or other detectable portion.

In some embodiments, the portion of downhole equipment for which detection is desired may be the source. In one embodiment, the actuatable member or other detectable portion may provide sufficient pressure to the sensor 402 to generate a detection event.

In some embodiments, emissions from a source 406 may be reflected off the portion of downhole equipment for which detection is desired. In one embodiment, a sensor 402 that is an optical sensor may trigger a detection event when it detects light from a source 406 reflected off of an actuatable member or other detectable portion. In another embodiment, a sensor 402 that is an acoustic sensor may trigger a detection event when it detects sound waves from a source 406 reflected off of an actuatable member or other detectable portion. The source 406 may be included within the signal generator 400, located proximate the signal generator 400, or located elsewhere.

In some embodiments, the sensor 402 may require clear line of sight to the actuatable member of other detectable portion in order to properly detect a detection event. Such clear line of sight may include holes or other openings between a compartment in which the sensor is located and the actuatable member or other detectable portion.

The signal generation device 404 may be any device capable of generating a detectable signal that may be ultimately received by a tool operator, a processor, or another receiver. The signal generation device 404 may generate detectable signals which are acoustic, electrical, or other in nature. As used herein, an electrical signal includes signals by wire and wireless (e.g., radio frequency). In certain embodiments, the signal generation device 404 is acoustic in nature and produces a discernible acoustic signal that is transmitted from the signal generator 400 to a tool operator or piece of receiving equipment. Such transmission may be through any combination of tubular conduction (e.g., mechanical conduction of acoustic signals through the tube string), hydrophonic conduction (e.g., picking up acoustic signals from a hydrophone located within functional distance of the signal generator 400, such as in nearby water), or other acoustic conduction means. A signal generation device 404 that generates acoustic signals may be primarily mechanical in nature (e.g., a mechanical hammer that creates noise by hammering an object), primarily electrical in nature (e.g., an electrical circuit driving an acoustic transducer to generate an acoustic sound), or other.

The signal generation device 404 may include elements capable of producing electrical signals that are transmitted to a tool operator or other receiver in various ways, such as by wire or wirelessly. In some embodiments, the signal generation device 404 sends a wireless signal that is repeated by one or more repeating elements positioned in the borehole. In such embodiments, these repeating elements may be unique repeating devices or may be other signal generation devices 404 configured to also operate as repeaters. These electrical signals may ultimately reach the control rig. These signals may result in display elements on a annunciator panel or computer screen, or any other method, visual or otherwise, of indicating the presence of an electrical signal to a tool operator.

In some embodiments, one or more signal generators 400 or one or more sensors 402 may be used. In such embodiments, each signal generator 400 may be capable of sending a signal that includes information about which sensor 402 detected a detection event. In some embodiments, multiple sensors 402 may be included in a single signal generator 400. Such information may include a serial number or other identifying information about the sensor 402 or signal generator 400. In such embodiments, the tool operator or other receiver may be able to discern which of multiple signal generators 400 or multiple sensors 402 detected a detection event. In embodiments where the signal generation device 404 is acoustic in nature, identifying information may be transmitted by producing acoustic patterns unique to particular sensors 402 or signal generators 400.

Figure 5:
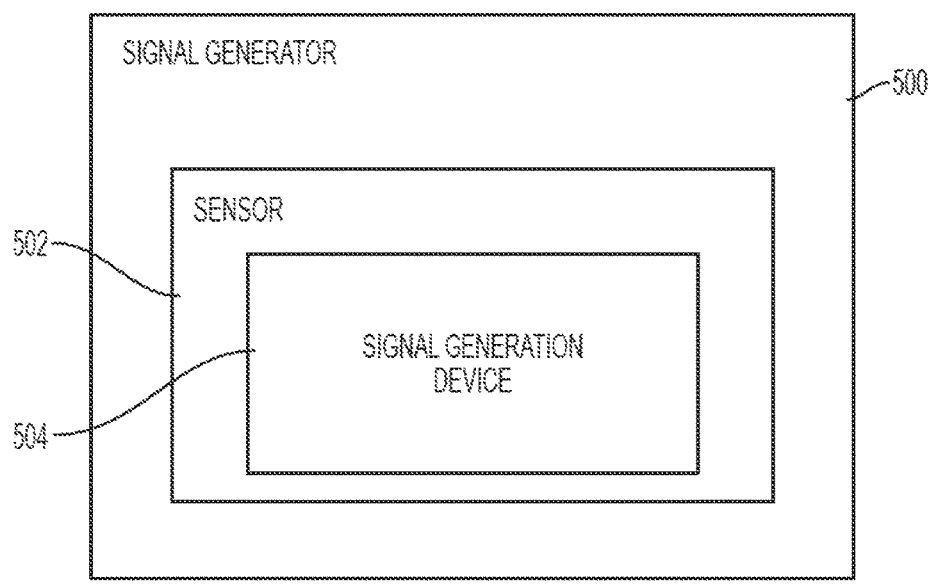
FIG. 5 is a schematic of an embodiment of a signal generator with a sensor incorporating a signal generation device according to one example.

FIG. 5 depicts a block diagram of an alternate embodiment of a signal generator 500 including a sensor 502 incorporating a signal generation device 504. This sensor 502 may act to both sense the proximity of the portion of downhole equipment for which detection is desired and produce a signal. In some embodiments, the sensor 502 is a mechanical device that produces an acoustic noise when it interacts with the portion of downhole equipment for which detection is desired (e.g., a spring-biased clapper that claps the tubing string when uncovered). In such embodiments, the signal is the acoustic noise.

Figure 6:
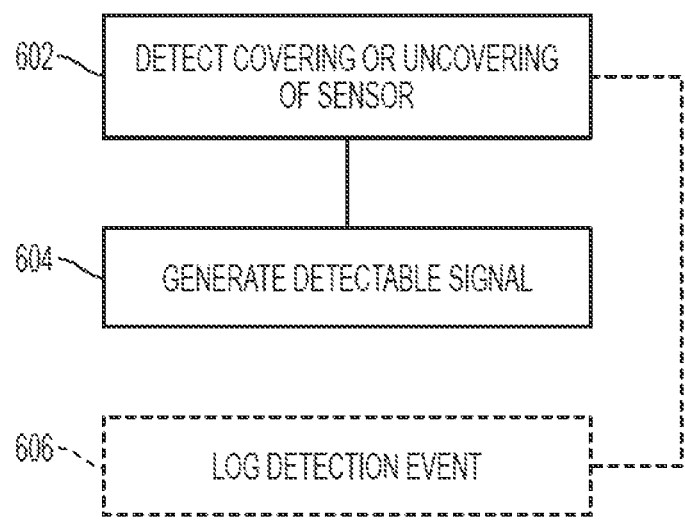
FIG. 6 is a flowchart of an example of a process of using a signal generator according to one embodiment.

FIG. 6 is a block diagram depicting an example of using the a signal generator according to an embodiment. A sensor detects a covering or uncovering of the sensor at 602. Upon detecting the detection event at 602, the signal generation device may generate a detectable signal at 604.

In some embodiments, the signal generator may log the detection event in an internal memory at 606. Such a log may include time information, location information, and any other information available to the sensor. Such a log may be accessed at a later time, as described further below. In alternate embodiments, the signal generator may not log any information and no internal memory may be present.

Figure 7:
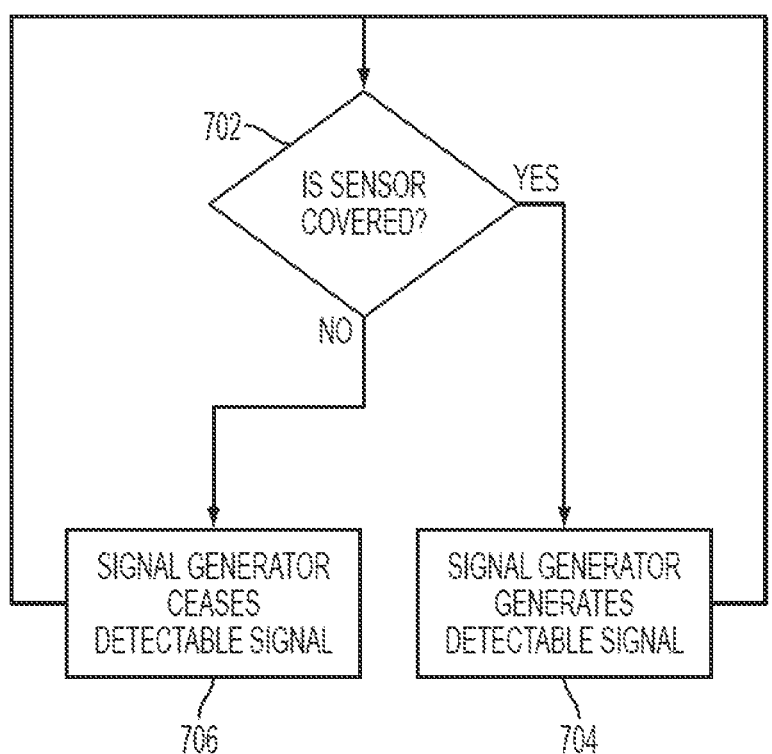
FIG. 7 is a flowchart of an example of a process of using a signal generator according to another embodiment.

FIG. 7 is a block diagram depicting an example of using a signal generator according to an alternate embodiment. A sensor detects whether it is covered at 702. If the sensor is covered, the signal generator begins generating a detectable signal at 704. 704 may continue indefinitely while the sensor remains covered. Whenever the sensor is no longer covered at 702, the signal generator may cease generating a detectable signal at 706.

In some embodiments, the sensor may instead detect whether it is no longer covered at 702.

In some embodiments, 704 and 706 may be switched, such that the signal generator does not generate a detectable signal while the sensor is covered, but generates a detectable signal whenever the sensor is not covered. In such embodiments, a signal generator may produce a detectable signal continuously as a tool is being inserted into the downhole space until the tool has reached the desired position, at which point the signal generator will cease generating a detectable signal.

Figure 8:
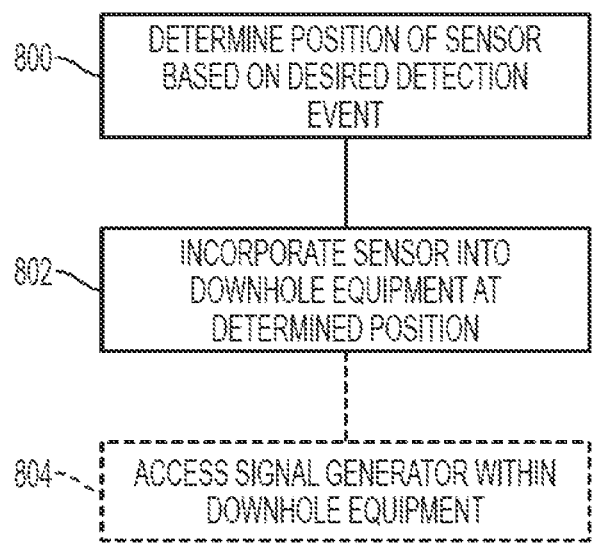
FIG. 8 is a flowchart of an example of a process of using a signal generator according to another embodiment.

FIG. 8 is a block diagram depicting an example of preparing a piece of downhole equipment for use with a signal generator according to an embodiment. The position of the sensor may be determined based on the desired detection event at 800. 800 may include preparing a piece of downhole equipment with a structure capable of covering or uncovering a signal generator. 800 may further include preparing any holes or other openings necessary for operation of the sensor. 800 may also include determining an existing structure that may be used to cover or uncover a signal generator. Once the position of the sensor has been determined, the sensor may be incorporated into the downhole equipment at the determined position at 802.

In some embodiments the signal generator may be accessed after it has been incorporated into the downhole equipment at 804. Such access may be for retrieval of saved or logged data in the signal generator, for repairs such as sensor replacement or battery replacement, for programming, or for other purposes. In some embodiments, the signal generator would be removable from the piece of downhole equipment. In some embodiments, the signal generator would be included within an accessible recess in the downhole equipment. In some embodiments, the signal generator would be accessible for data collection and/or recharging without removing the signal generator from the piece of downhole equipment. Such access may be achieved through physical connection through ports on the piece of downhole equipment, through wireless (e.g., radio frequency or inductive communications), or other means. In some embodiments, the signal generator may be permanently or semi-permanently included in the downhole equipment and may not be accessible without destroying the signal generator or the downhole equipment. In some embodiments, the signal generator is not accessed after it has been incorporated into the downhole equipment.

Figure 9A:
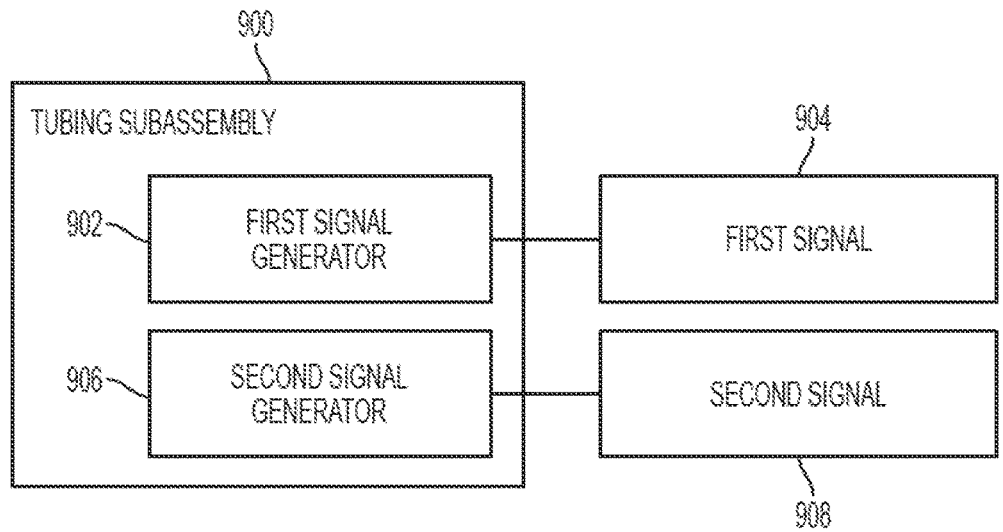
FIG. 9A is a block diagram of an embodiment with a tubing subassembly having two signal generators according to one example.

FIG. 9A is a block diagram of an embodiment with a tubing subassembly having two signal generators according to one example. A tubing subassembly 900 is shown having a first signal generator 902 and a second signal generator 906. Upon being covered and/or uncovered (e.g., a first detection event), the first signal generator 902 can generate a first signal 904. Upon being covered and/or uncovered (e.g., a second detection event), the second signal generator 906 can generate a second signal 908. The second signal 908 can be unique and discernibly different from the first signal 904. The first signal generator 902 and second signal generator 906 can be placed such that the first signal 904 and second signal 908 are generated in response to different parameters of the tubing subassembly, such as a position, an actuation, a set state, a released state, a locked state, or an unlocked state. The first signal 904 and second signal 908 can each be electrical or acoustic in nature.

In one aspect, the tubing subassembly can be a ported sleeve where both the first and second signal generators 902, 906 generate no signals when the port is opened, the first signal generator 902 generates a first signal 904 when the port is closed, and the second signal generator 906 generates a second signal 908 when the port is closed and the tubing subassembly is in a locked state.

Figure 9B:
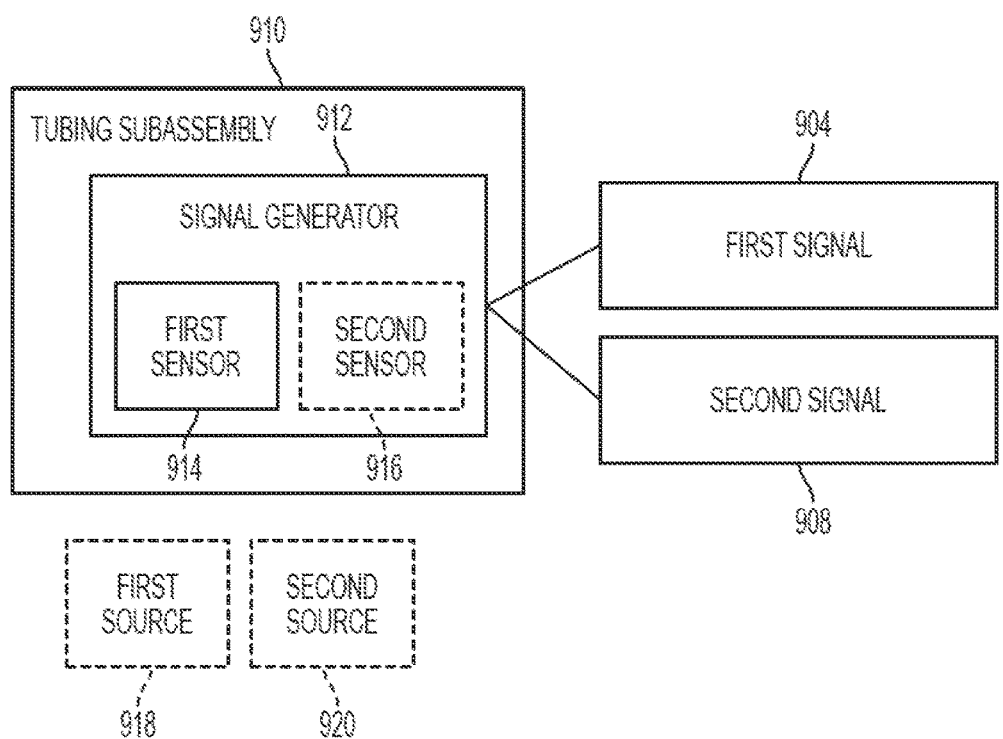
FIG. 9B is a block diagram of an alternate embodiment with a tubing subassembly having one signal generator according to one example.

FIG. 9B is a block diagram of an alternate embodiment with a tubing subassembly having one signal generator according to one example. A tubing subassembly 910 is shown having a signal generator 912. Upon being covered and/or uncovered, the signal generator 912 can generate either a first signal 904 or a second signal 908. The second signal 908 can be unique and discernibly different from the first signal 904. The signal generator 902 can generate the first signal 904 in response to one parameter of the tubing subassembly and can generate the second signal 908 in response to another parameter of the tubing subassembly. Parameters of the tubing subassembly can include a position, an actuation, a set state, a released state, a locked state, or an unlocked state.

In one aspect, the tubing subassembly can be a ported sleeve where the signal generator 912 generates no signals when the port is opened, generates a first signal 904 when the port is closed, and generates a second signal 908 when the port is closed and the tubing subassembly is in a locked state.

In one aspect, the signal generator 912 can include a first sensor 914 and a second sensor 916. Such a signal generator 912 can generate a first signal 904 in response to a first sensor 914 being covered or uncovered (e.g., a first detection event), and can generate a second signal 908 in response to a second sensor 916 being covered or uncovered (e.g., a second detection event).

In one aspect, the signal generator 912 can include only a first sensor 914. The signal generator 912 can be configured to discern between the first sensor 914 being covered in different manners and generate a first signal 904 when covered in a first manner (e.g., a first detection event) and generate a second signal 908 when covered in a second manner (e.g., a second detection event).

In one aspect, the signal generator 912 can be configured to discern between the first sensor 914 being covered by a first source 918 and a second source 920. In one aspect, the first sensor 914 may be a magnetic sensor and the first source 918 may have a magnetic field strength that is discernibly different from that of a second source 920. In another aspect, the first sensor 914 may be a sonar sensor and the first source 918 may have a discernibly different sonar response than that of the second source 920.

The foregoing description of the aspects, including illustrated aspects, of the disclosure has been presented only for the purpose of illustration and description and is not intended to be exhaustive or to limit to the precise forms disclosed. Numerous modifications, adaptations, and uses thereof will be apparent to those skilled in the art without departing from the scope of this disclosure.

What is claimed is:

1. A system positionable downhole in wellbore, the system comprising:
   a tubing subassembly;
   an acoustic sensor that is operable to detect sound waves reflected from an actuatable member or detectable portion of a downhole tool; and
   an acoustic signal generator positioned in a compartment of the tubing subassembly for (i) receiving a signal from the acoustic sensor that indicates that the signal generator is uncovered by the actuatable member or detectable portion of the downhole tool and (ii) responsively outputting a detectable signal usable to determine a parameter of the downhole tool in response to the signal from the acoustic sensor;
   wherein the parameter of the downhole tool includes a first parameter and a second parameter, the first parameter indicates the downhole tool is in a set state or a released state and the second parameter indicates the downhole tool is in a locked state or an unlocked state.

2. The system of claim 1, wherein the acoustic signal generator includes one or more signal generators in the tubing subassembly, at least one signal generator being operable for outputting, in response to being covered or uncovered by the actuatable member or detectable portion of the downhole tool, a second detectable signal that is different than the detectable signal to determine a change in the parameter or to determine the second parameter of the downhole tool.

3. The system of claim 1, wherein:
   the acoustic signal generator includes the acoustic sensor for detecting being covered or uncovered by the detectable portion.

4. The system of claim 3, wherein the acoustic sensor is a sonar sensor.

5. The system of claim 1 additionally comprising a repeating element located between the acoustic signal generator and a control rig.

6. The system of claim 1, additionally comprising a memory, wherein the detectable signal is a log entry in the memory.

7. The system of claim 1, wherein:
   the acoustic signal generator includes the acoustic sensor for detecting being covered or uncovered by the actuatable member or detectable portion;
   the downhole tool is a separate part from the tubing subassembly; the compartment is positioned such that the detectable portion uncovers the compartment and the acoustic sensor when the downhole tool is in the set state; and wherein the acoustic signal generator is operable for outputting an acoustic signal into a wellbore environment.

8. A downhole notification method comprising:

detecting an acoustical detection event by an acoustic sensor that is operable to detect sound waves reflected from an actuatable member or detectable portion of a downhole tool, the acoustic sensor communicatively coupled to an acoustic signal generator positioned within a compartment in a tubing subassembly, the acoustical detection event corresponding to an uncovering of the acoustic signal generator by the actuatable member or detectable portion of the downhole tool; and generating a detectable signal, by the acoustic signal generator usable to determine a parameter of the downhole tool, in response to receiving a signal from the acoustic sensor, the signal indicating the acoustic sensor detected the acoustical detection event;

wherein the parameter of the downhole tool includes a first parameter and a second parameter, the first parameter indicates the downhole tool is in a set state or a released state and the second parameter indicates the downhole tool is in a locked state or an unlocked state.

9. The method of claim 8, wherein the acoustic signal generator includes one or more acoustic signal generators, additionally comprising:

detecting a second detection event by the acoustic sensor corresponding to at least one acoustic signal generator being covered or uncovered by the actuatable member or detectable portion; and generating a second detectable signal that is different than the detectable signal.

10. The method of claim 8, wherein the acoustic signal generator is positioned such that the detectable signal correlates to the set state of the downhole tool or the release state of the downhole tool and the locked state of the downhole tool or the unlocked state of the downhole tool.

11. The method of claim 8, wherein:

the acoustic signal generator includes the acoustic sensor.

12. The method of claim 11, wherein the acoustic sensor is a sonar sensor and the detecting is performed by sonar.

13. The method of claim 8, wherein the detectable signal includes information indicative of an identification of the acoustic signal generator, a location of the acoustic signal generator, or state of the downhole tool.

14. The method of claim 8, additionally comprising:
logging the acoustical detection event in a memory.

15. The method of claim 8, additionally comprising:
relaying the detectable signal through a repeater to a control rig.

16. A system positionable downhole in wellbore, the system comprising:

a tubing subassembly having a compartment;

an acoustic signal generator, for determining a parameter of a downhole tool, the acoustic signal generator including a signal generation device and an acoustic sensor that is operable to detect sound waves reflected from an actuatable member or detectable portion of the downhole tool; wherein:

the acoustic sensor is positioned in the compartment for detecting the compartment being uncovered by the actuatable member or detectable portion of the downhole tool;

the signal generation device is operatively coupled to the acoustic sensor for (i) receiving a signal from the acoustic sensor that indicates that the compartment with the acoustic sensor is uncovered by the actuatable member or detectable portion of the downhole tool and (ii) responsively generating an acoustic signal or an electrical signal usable to determine the parameter of the downhole tool; and the parameter of the downhole tool includes a first parameter and a second parameter, the first parameter indicates the downhole tool is in a set state or a released state, and the second parameter indicates the downhole tool is in a locked state or an unlocked state.

17. The system of claim 16, wherein:

the tubing subassembly is a tubing string;

the compartment includes an opening to an outer diameter of the tubing string;

the actuatable member or detectable portion is a portion of the downhole tool locatable about the outer diameter of the tubing string; and the acoustic sensor is located such that it is coverable by the downhole tool when the downhole tool is in a released position.

* * * * *